(12) United States Patent
Smith et al.

(10) Patent No.: US 8,827,168 B2
(45) Date of Patent: Sep. 9, 2014

(54) METHOD FOR GENERATING IMAGES FROM TEXT

(76) Inventors: Timothy Smith, Rolling Meadows, IL (US); Thirugnanamurugan Ramalingame, Carol Stream, IL (US)

( * ) Notice: Subject to any disclaimer, the term of this patent is extended or adjusted under 35 U.S.C. 154(b) by 694 days.

(21) Appl. No.: 12/946,486

(22) Filed: Nov. 15, 2010

(65) Prior Publication Data

US 2012/0118982 A1    May 17, 2012

(51) Int. Cl.
 *G06K 19/06*    (2006.01)
(52) U.S. Cl.
 USPC .......................................................... 235/494
(58) Field of Classification Search
 USPC ........................................... 235/462.01, 494
 See application file for complete search history.

(56) References Cited

U.S. PATENT DOCUMENTS

| 6,279,828 | B1 | 8/2001 | Fann | 235/462.01 |
| 2007/0106529 | A1* | 5/2007 | Dixon et al. | 705/1 |
| 2008/0048044 | A1 | 2/2008 | Zhao et al. | 235/494 |
| 2008/0304891 | A1* | 12/2008 | Saijo et al. | 400/76 |
| 2010/0053650 | A1* | 3/2010 | Yamamoto | 358/1.9 |

FOREIGN PATENT DOCUMENTS

| KR | 10-2007-0020336 | 2/2007 |
| WO | WO 95/12863 | 5/1995 |

OTHER PUBLICATIONS

International Preliminary Report on Patentability issued in corresponding foreign application, PCT/US2011/060581, pp. 1-6 (May 30, 2013).
International Search Report issued in corresponding foreign application, PCT/US2011/060581, pp. 1-5 (Apr. 25, 2012).
Written Opnion issued in corresponding foreign application, PCT/US2011/060581, pp. 1-5 (Apr. 25, 2012).

* cited by examiner

*Primary Examiner* — Seung Lee
(74) *Attorney, Agent, or Firm* — David G. Rosenbaum; J. Peter Paredes; Rosenbaum IP, P.C.

(57)    ABSTRACT

A computer assisted method for generating an image from a text character includes the steps of reading the text character from a machine readable storage device and pattern mapping the text character to a pattern of multiple-valued text characters, and rendering the image.

43 Claims, 11 Drawing Sheets

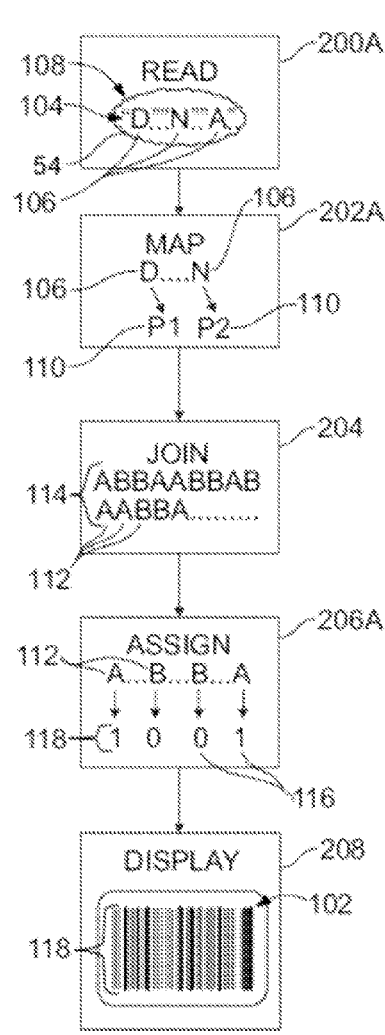
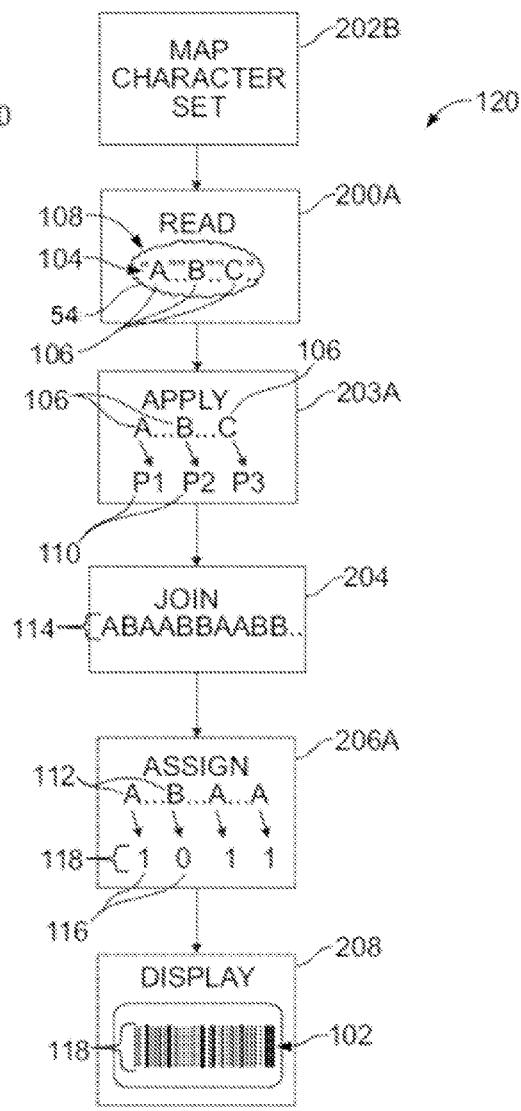
FIG. 3A
FIG. 3B

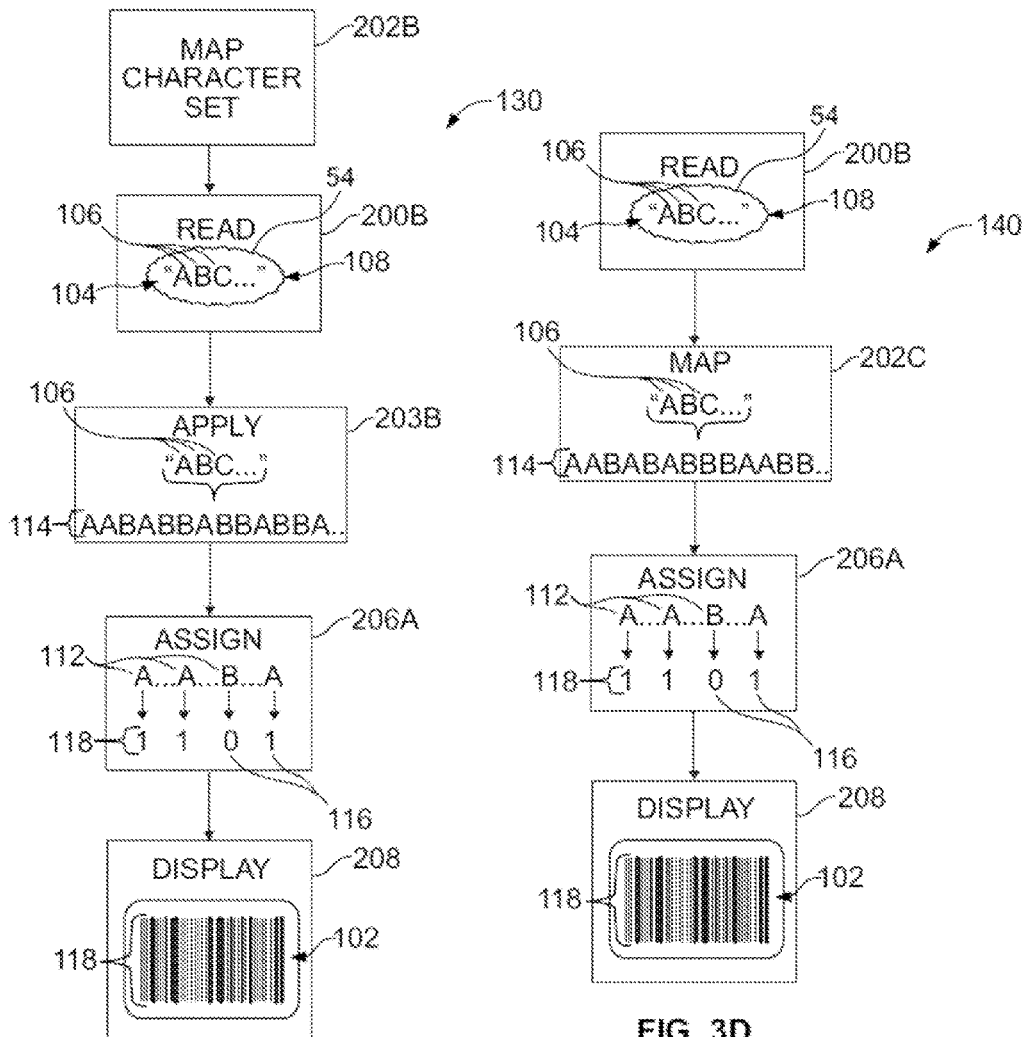

```
Function GetCode128DIGIT(C Char) return number is
begin
  case C
    when CHR(31) then return 95;
    when CHR(32) then return 0;
    when CHR(33) then return 1;
    when CHR(34) then return 2;
Comment - CHR(35) thru CHR(125) return 3 thru 93, respectively.
    when CHR(126) then return 94;
    when CHR(130) then return 98;
    when CHR(131) then return 97;
    when CHR(132) then return 96;
    when CHR(133) then return 98;
    when CHR(134) then return 100;
    when CHR(135) then return 99;
    when CHR(136) then return 103;
    when CHR(137) then return 104;
    when CHR(138) then return 105;
    when CHR(139) then return 106;
  else
    return -1;
  end case;
end GetCode128Digit;

Function GetBarSpacesFromDigit(Idx number) return Varchar2 is
begin
  case Idx
    when 0 then return 'BBSBBSSBBSS';
    when 1 then return 'BBSSBBSBBSS';
    when 2 then return 'BBSSBBSSBBS'; --cases 3 thru 104 removed for conciseness
    when 105 then return 'BBSBSSBBBSS';
    when 106 then return 'BBSSSBBBBSBB';
  Else
    return '';
  end case;
end GetBarSpacesFromDigit;
```

FIG. 4

```
Function GetCode128BarCodeAsBS(sBarcode Varchar2) return Varchar2 is
  I Number;
  iCheckValue Number;
  iCheckIndex Number;
  cCheckChar Char;
  Result Varchar2(4000);
begin
  iCheckValue := 104;
  for I in1 .. Length(sBarcode)
  loop
    iCheckValue := iCheckValue+(GetCode128Digit(substr(sBarcode,I,1))*I);
  end loop;

iCheckIndex := iCheckValue mod 103;

Result := GetBarSpacesFromDigit(104); -- Start Char         250 for I in 1 .. Length(sBarCode)
  loop
    Result := Result || GetBarSpacesFromDigit(GetCode128Digit(substr(sBarcode,I,1)));
  end loop;

Result := Result || GetBarSpacesFromDigit(iCheckIndex);
  Result := Result || GetBarSpacesFromDigit(106);
  return Result;
end GetCode128BarCodeAsBS;
```

FIG. 5

```
S := GetCode128BarCodeAsBS(sBarcode);
PixelCount := 0;
for I in 1 .. Length(S)
loop
    if SubStr(S,I,1) = 'S' then
        Result := Result || Chr(225);
    else
        Result := Result || Chr(0);
    end if;
    PixelCount := PixelCount + 1;
end loop;
```

FIG. 6

```
Head1 := chr(66) || chr(77) || chr(0) || chr(0) || chr(0) || chr(0) || chr(0) || chr(0) || chr(0) ||
chr(62) || chr(0) || chr(0) || chr(0) || chr(40) || chr(0) || chr(0) || chr(0);
Head2 := CHR(0)||CHR(0)||CHR(1)||CHR(0)||CHR(0)||CHR(0)||CHR(0)||CHR(1)||CHR(0)||
CHR(1)||CHR(0)||CHR(0)||CHR(0)||CHR(0)||CHR(0)||CHR(0)||CHR(0)||CHR(0)||
CHR(0)||CHR(0)||CHR(0)||CHR(0)||CHR(0)||CHR(0)||CHR(0)||CHR(0)||CHR(0)||
CHR(0)||CHR(0)||CHR(0)||CHR(0)||CHR(0)||CHR(0)||CHR(0)||CHR(0)||CHR(0)||
CHR(0)||CHR(0)||CHR(0)||CHR(255)||CHR(255)||CHR(255)||CHR(255)||CHR(0)
Result := Head1 || Chr(mod(Len,225)) || Chr(Trunc(Len/255)) || Head2;
```

FIG. 7

```
CREATE OR REPLACE VIEW dnaexamw_bc ("Worksheet ID", "Bar Code")
AS
SELECT "Worksheet ID",
    getcode128barcodeasbmp
        ( dW || pic_numbertobase64 ("Worksheet ID")
        ) AS "Bar Code"
FROM dnaexamw;
```

FIG. 8

```
CREATE OR REPLACE function NumberToBase64 (KeyNum Number) return Varchar2 is
Base64Set constant Varchar2(64) := '0123456789+ABCDEFGHIJKLMNOPQRSTUVWXYZ-abcdefghijklmnopqrstuvwxyz';
S Varchar2(100);
I Number;
Num Number;

function Base64Char (N Number) return varchar2 is
N1 Number;
begin
  N1 := N;
  N1 := N1+1;
  if (N1 >= 1) and (N1 <= Length(Base64Set)) Then
    return SubStr(Base64Set,N1,1);
  else
    return '?';
  end if;
end;

begin
  Num := KeyNum;
  S := '';
  for I in 1..5
  loop
    S := Base64Char(BitAnd(Num, 63)) || S;
    Num := Trunc(Num / 64);
  end loop;
  return S;

end NumberToBase64;
```

FIG. 11

METHOD FOR GENERATING IMAGES FROM TEXT

CROSS-REFERENCE TO RELATED APPLICATIONS

Not Applicable.

BACKGROUND OF THE INVENTION

The present invention relates generally to a method for generating an image from a string of text characters. More particularly, the present invention relates to a method for generating bitmap images on demand within a database server using only strings of text characters within stored procedures.

It has been said that a picture is worth a thousand words and perhaps this has never been more true than today. The explosion of information stored on modern computer systems and transferred across the Internet has fed the need for larger and more complex information storage systems. Powerful database servers have been developed not only to store information, but to allow a user to sort, categorize, manipulate, reformat, share, and interpret the information in useful ways. One known use of database servers is, for example, the tracking of a variety of attributes of a package such as location, size, weight, contents, value, ownership, delivery address, scheduled delivery date, etc. In this application, a field within the database server representing the package may be associated with a field within the database server for each of the noted attributes. Any one of these attribute fields may contain a small or a large quantity of information that requires periodic updating from the field, which in this example, is the location of the package.

Barcodes have come into use as an efficient way of transferring the sort of large quantities of information stored in a database server such as may be involved in the example of a package noted above. Other examples of information stored in database servers may include tracking of test samples in a laboratory, evidence in an investigation, or a fleet of vehicles, among others. Typically, a barcode is generated that includes enough relevant information to identify an item and may be placed on the item, either by direct printing, an adhesive printed label, or other means. Subsequently, a scanner can read the barcode and transmit the relevant information to a user operating a database server for updating of one or more attributes of the item or for other purposes.

There are several methods currently used for generating barcodes from strings of text within a database server for the purpose of printing the barcode. All of the existing methods involve the use of software and/or computations executed outside of the database server. For example, some printers include software associated with the printer that is able to convert text read from a database server into a barcode format while printing. Alternatively, workstations can include software that can convert text read from a database server into a barcode image and subsequently transmit the barcode image to a printer. Some workstations include special fonts or image libraries for the conversion of text from a server database to a barcode image. In some cases, upon data entry at a workstation, software on the workstation can convert text to a barcode image using one of the methods noted above and store the image in a database server.

The existing methods for generating barcodes from text in a database server suffer from several shortcomings. All of the existing methods require additional software and/or hardware in addition to the database server to generate a barcode for printing. Further, all of the existing methods require that the barcode image generated from a workstation during data entry be stored along with the text data. Storing the generated barcodes unnecessarily is a waste of resources, and the fonts and image libraries often used in generating the barcodes can be unwieldy and execute slowly, thus wasting time.

There exists a need for a method of generating bitmap images, for example, barcodes, from strings of text within a database server without requiring image libraries or external software and/or hardware. Such a method benefits from operating on the fly on strings of text within a database without a requirement that the bitmap images be stored within the database. Such a method also benefits from the ability to generate a bitmap having any desired orientation, and in the case of generating a barcode, benefits from the ability to utilize any barcode encoding scheme. Further, conventional methods including image libraries may contain image characters that utilize a byte of data per character, whereas a method utilizing bitmap images further benefits from saving of memory space in temporary storage and manipulation of bitmap images compared to the conventional methods.

SUMMARY OF THE INVENTION

In one aspect of the present invention, a computer assisted method for generating an image from a text character is presented. The method includes the steps of reading the text character from a machine readable storage device, pattern mapping the text character to a pattern of multiple-valued text characters, and rendering the image.

In another aspect of the present invention, a computer assisted method for generating an image from a string of text characters is presented. The method includes the steps of reading the string from a machine readable storage device and pattern mapping each text character to a pattern of multiple-valued text characters, and rendering the image.

In a further aspect of the present invention, a computer assisted method for generating an image from a string of text characters is presented. The method includes the steps of creating a pattern mapping of each of the set of text characters to a pattern of multiple-valued text characters, reading the string of text characters from a machine readable storage device and applying the pattern mapping to the string to produce a composite pattern of multiple-valued text characters, and rendering the image.

In yet another aspect of the present invention, a computer assisted method for generating an image from a string of text characters is presented. The method includes the steps of assigning values of multiple-valued text characters to bits, reading the string of text characters from a machine readable storage device, and pattern mapping each text character to a pattern of multiple-valued text characters, and rendering the image.

In yet a further aspect of the present invention, a computer assisted method for generating an image from a string of text characters is presented. The method includes the steps of pattern mapping each of the set of text characters to a pattern of multiple-valued text characters, assigning a value of each multiple-valued text character to at least one bit, and reading the string of text characters from a machine readable storage device. The method further includes the steps of applying the pattern mapping to the string to produce a composite pattern of multiple-valued text characters, and rendering the image.

In yet a further aspect of the present invention, a computer assisted method for generating an image from a string of text characters on a database server is presented. The method includes the steps of executing a first process within the database server for reading the string of text characters from a storage location within the database server and executing a second process on the database server for pattern mapping the string of text characters to a pattern of multiple-valued text characters. The method further includes the steps of executing a third process on the database server for rendering the image.

The foregoing summary, as well as the following detailed description of the preferred embodiments, will be understood when read in conjunction with the appended drawings.

BRIEF DESCRIPTION OF THE FIGURES

FIG. 3A illustrates an embodiment of a method for generating an image from a string of text.

FIG. 3B illustrates another embodiment of a method for generating an image from a string of text.

FIG. 3C illustrates a further embodiment of a method for generating an image from a string of text.

FIG. 3D illustrates yet another embodiment of a method for generating an image from a string of text.

FIG. 4 illustrates a sample of code useful in execution of Blocks 202A-202C.

FIG. 5 illustrates a sample of code useful in execution of Blocks 202A-202C, 204, 206A, 206B, 600, 610, and 620.

FIGS. 6-8 illustrate samples of code useful in execution of Block 208.

FIG. 11 illustrates a sample of code useful in execution of Block 420.

The foregoing and other features and advantages of the invention are apparent from the following detailed description of exemplary embodiments, read in conjunction with the accompanying drawings, wherein like structural or functional elements may be designated by like reference numerals.

DETAILED DESCRIPTION OF THE PREFERRED EMBODIMENTS

A method for generating an image, for example, a machine readable image, from a string of text characters stored on a machine readable storage device is disclosed herein. The method does not utilize special fonts or image libraries. When executed on a database server, the method executes all steps of the method within the database server. Database servers are currently used and known in the art, including by way of example and not limitation, Database 11g sold by Oracle® Corporation of Redwood Shores, Calif., and Microsoft® SQL SERVER® 2008 sold by Microsoft® Corporation of Redmond, Wash. The method disclosed herein can be executed universally on any database server, though associated computer code may vary somewhat for different database servers. When utilized to generate a machine readable barcode, the method can generate a barcode using any type of encoding scheme as known in the art. The method is described in terms of embodiments of combinations of functional Blocks that may each execute a task or series of tasks via a process or series of processes running on the database server.

Text characters are typically represented, mapped, or encoded as numbers that a machine can manipulate using some form of ASCII encoding as known in the art. There are encodings that are applicable to Latin text, Cyrillic text, Arabic text, Chinese text, etc. The type of encoding that is applied to a particular character set may be selected based on the number of characters present in the character set. For example, in one form of ASCII encoding, there are 128 possible characters, which are each encoded using 7 bits ($2^7$=128). Other forms of ASCII as known in the art utilize 8 bits and comprise 256, or $2^8$ possible characters. In such an 8-bit encoding scheme, each text character is encoded as one byte of information represented by an 8-digit binary number.

Figure 1:
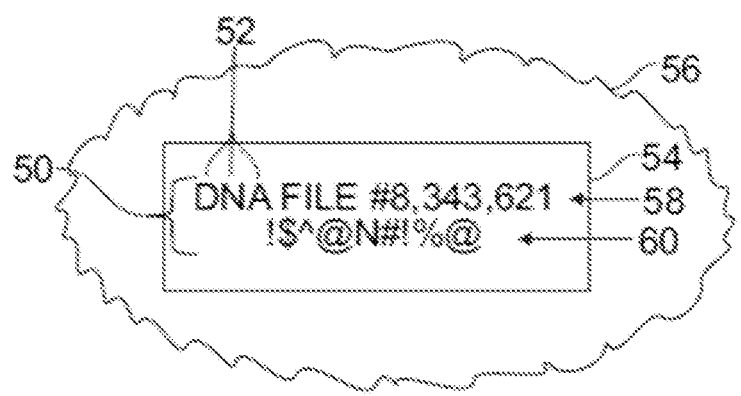
FIG. 1 illustrates the use of a barcode font by the PRIOR ART.

FIG. 1 illustrates a step in a prior art method for generating a machine readable image, in this example a barcode, from a string 50 of text characters 52 in a storage location 54 within a database server 56. The top line 58 of the string 50, "DNA FILE #8,343,621" may represent, for example, an identifier for a particular batch of DNA or a series of tests run thereon. The bottom line 60, "!$^@~#!%@" represents what a barcode for the top line 58 looks like in a special barcode font. In the prior art, when a workstation reads the special barcode font, the workstation can convert the font into a barcode for printing. However, such methodology is problematic for several reasons, as discussed in the Background section.

Figure 2:
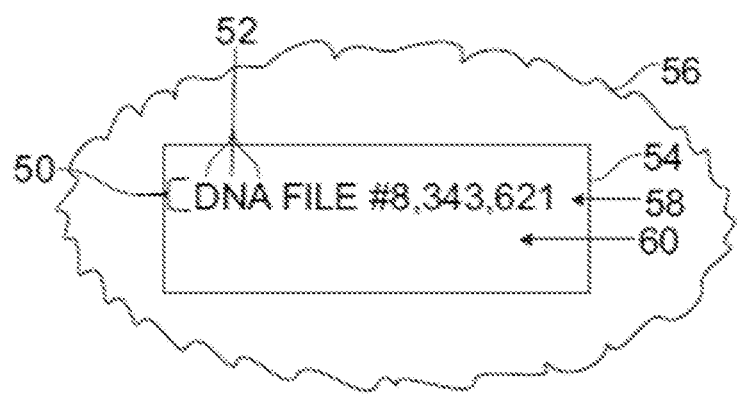
FIG. 2 illustrates a database entry lacking special font characters.

Referring to FIG. 2, the top line 58 of the storage location 54 is presented as it would appear in the database server 56, utilizing an inventive method for generating a machine readable image, wherein the method does not utilize special fonts or image libraries. In this method, the bottom line 60 representing the barcode in a special font is unnecessary and is left blank, thus eliminating wasted memory space within the database server 56.

Referring to FIG. 3A, in one embodiment of a method 100 for generating an image 102 from a string 104 of text characters 106, Block 200A reads the string 104 of text characters 106 one text character 106 at a time from a storage location on a machine readable storage device 108, for example, at the storage location 54 of a database server 56, as discussed with regard to FIGS. 1 and 2. The string 104 could have been input into the database server 56 manually via a keyboard, or electronically via a process running on another database server or within the database server 56.

Referring again to FIG. 3A, Block 202A maps each text character 106 of the string 104 to a pattern 110 (P1, P2, . . . ) of multiple-valued text characters 112. Each pattern 110 is unique to a text character 106 for a given image symbology. The number of multiple-valued text characters 112 and the multiple of the multiple-values used in the symbology contained within each pattern 110 may be selected for the symbology. For example, in one symbology, the text character D may be mapped to a pattern 110 having 11 binary-valued text characters 112 such as ABBAABBABAA. In another symbology, the text character D may be mapped to a pattern of seven 4-valued text characters 112 such as ASDFDSA. Various symbologies commonly used for rendering barcodes include, by way of example and not limitation, Code 39, Code 128, EAN8, ITF-14, among others.

As noted, the actual multiple-valued text characters 112 used in creating the pattern 110, in the example above are binary-valued text characters, A and B. The actual text characters used are arbitrary and any two distinct text characters 106 may be used. The same follows for multiple-valued text characters 112 having a value for the multiple greater than two. For example, in creating a pattern 110 including 8-valued text characters 112, any eight arbitrarily chosen distinct text characters 106 maybe used. The actual multiple-valued text characters 112, though arbitrary, may represent a pattern recognizable to a human user. For example, in another example, the above noted pattern could be mapped as BSS-BBSSBSBB, in which B represents a bar and S represents a space for the rendering of a barcode.

The pattern mapping executed by the Block 202A may be accomplished before or after execution of the Block 200A. For example, in another embodiment of a method 120 for generating an image 102 from a string 104 of text characters 106, Block 202B maps all text characters 106 of a character set, for example, the alphabet, to unique patterns 110 before execution of the Block 200A, as illustrated in FIG. 3B. The character set for the alphabet includes 26 capital letters and 26 lower case letters for a total of 52 characters. Thus, in this embodiment, the Block 202B uniquely pattern maps each of the 52 characters to a pattern of multiple-valued text characters 112 and stores the mapping in a first memory location. Subsequently, the Block 200A reads each text character 106 into a second memory location. Block 203A applies the mapping produced by the Block 202B to the text character 106 and retrieves the unique pattern 110 corresponding to the text character 106. In another embodiment 130, referring to FIG. 3C, the Block 200B reads the entire string 104 into memory and Block 203B applies the mapping produced by the Block 202B to the string 104 to produce a composite pattern 114, as described further hereinbelow.

In another embodiment 140, the Block 200B reads the entire string 104 into memory before any mapping is executed, as illustrated in FIG. 3D. In this embodiment, Block 202C executes the mapping and inputs the string 104 into the mapping to produce the composite pattern 114 as described further hereinbelow. Each of the Blocks 200A, 200B, 202A, 202B, and 202C may be a process or a portion of a process running on the database server 56.

An example of sample code useful in the execution of the Blocks 202A-202C is illustrated in FIG. 4. The code in FIG. 4 and all examples of code presented herein are suitable for use on the Oracle® Database 11g database server. Code suitable for use on other database servers may vary. Referring to FIG. 4, a first function "GetCode128Digit(C Char)" outputs a unique decimal number for each text character 106 input. A second function "GetBarSpacesFromDigit(Idx number)" outputs the pattern 110 for each number corresponding to a text character 106 input. The sample code in FIG. 4 is one way to execute the Blocks 202A-202C, provided by way of example and not limitation.

Referring to FIGS. 3A and 3B, in the embodiments 100 and 120, respectively, Block 204 joins the patterns 110 to produce a composite pattern 114 comprising the multiple-valued text characters 112. In the embodiment 130, referred to hereinabove with regard to FIG. 3C, the Block 203B produces a composite pattern 114 by application of the mapping of the Block 200B without the joining step executed by the Block 204. Similarly, in the embodiment 140, referred to hereinabove with regard to FIG. 3D, the Block 202C maps the entire string 104 to produce the composite pattern 114 without the joining step executed by the Block 204. An example of sample code for the execution of the Block 202C in the embodiments 130 and 140 is illustrated in FIG. 5 by way of example and not limitation.

Referring to FIG. 5, beginning with the line marked as 250, the code assigns a start pattern 110 to the composite pattern 114. Next, in this example, within a loop that executes for each text character 106 in the string 104, the code calls each of the functions described with regard to FIG. 4 to select a pattern 110 and append the pattern 110 onto a right side of the composite pattern 114. Each of the Blocks 203A, 203B, and 204 may be a process or a portion of a process running on the database server 56.

In other embodiments, each subsequently amended pattern 110 may be amended onto a left side of the composite pattern 114. The side of the composite pattern 114 to which subsequent patterns are appended is arbitrary and may be selected by the practitioner of the method 100; however, the composite patterns 114 that are appended on the left side will produce a different image 102 than the composite patterns 114 that are appended on the right side.

Next, an end pattern is appended onto the right side of the composite pattern 114. A checksum is also computed and appended onto the composite pattern 114; however, the checksum is optional and is described hereinbelow with regard to another embodiment.

Referring to FIGS. 3A-3D, based on the value of each multiple-valued text character 112, in one embodiment, Block 206A assigns a value of each of the multiple-valued text characters 112 to at least one bit 116 of a plurality of bits 118 as a step in rendering the image 102. In another embodiment, the value of each of the multiple-valued text characters 112 may be encoded using a different encoding scheme from the encoding scheme used to read the string 104 of text characters 106 read from the storage location 54 by the Block 200A. However, in this embodiment, the value of each of the multiple-valued text characters 112 is encoded in the same encoding scheme, for example, an ASCII 8-bit scheme, as the encoding scheme used to read the string 104 of text characters 106 read from the storage location 54 by the Block 200A. Therefore, the value of each of the multiple-valued text characters 112 may be encoded as eight bits or one byte of information represented by an 8-digit binary number. The binary-valued text characters 112 may be encoded as eight digits of zeros or eight digits of ones. In other embodiments, other encoding schemes may be used in rendering the image, for example, individual bits may be used to create a pixel level encoding; however, in the rendering of barcodes, the larger size allows for sharper rendering of the image.

An example of sample code for the encoding of the binary-valued text characters 112 as an 8-digit binary number is illustrated in FIG. 6 by way of example and not limitation. Referring to FIG. 6, the code executes a loop that executes for each binary-valued text character 112 in the composite pattern 114 (represented by the variable sBarcode). Each time through the loop, the code appends either a char(255), which is 11111111 in binary, or a char(0), which is 00000000 in binary, to a variable called Result. The Block 206A in FIG. 3A is illustrated as assigning a value of each of the binary-valued text characters 112 to a single bit, either 0 or 1, because as will be described hereinbelow, in this embodiment, Block 208 utilizes only 1 bit of information from each byte, the other seven bits in each byte not being used. The Block 206A may be a process or a portion of a process running on the database server 56.

Because there are two values for the binary-valued text characters 112, each bit 116 so assigned can have one of two values, a zero or a one. In this embodiment, one of the binary-valued text characters 112 is assigned to a zero value bit 116 and the other of the binary-valued text characters is assigned to a bit 116 having a value of one; however, the selection of which binary-valued text character 112 is assigned to which value for each assigned bit 116 is entirely arbitrary and may be selected to match the encoding scheme selected to uniquely map the text characters 106 to the patterns 110 of binary-valued text characters 112 executed by the Blocks 202A-202C, or for other reasons. For example, it is known in the art that in Windows® operating systems, a bit 116 having a value of 1 represents a white pixel on a display and a zero valued bit 116 represents a black pixel on the display. Alternatively, in Apple® operating systems, the reverse is true, namely that a bit 116 having a value of 1 represents a black pixel and a zero valued bit 116 represents a white pixel.

Thus, the binary-valued text characters 112 in this example serve the purpose of providing a sequenced pattern of elements that are expressed as having one of two possible states. The value of each binary-valued text character 112 can be assigned to a single data bit 116 having two states representing, for example, a pixel on or off, as noted hereinabove. It is contemplated that the use of multiple-valued text characters 112 having a multiple greater than 2 can be used in rendering images 102 containing pixels that display more information than just being on or off. For example, a 4-multiple text character 112 can be assigned to two bits of data that can represent 4 distinct colors or 4 distinct symbols for display by a single pixel or group of pixels. Similarly, an 8-multiple text character 112 can be assigned to three bits of data that can represent 8 distinct colors or 8 distinct symbols for display by a single pixel or group of pixels, a 16-multiple text character 112 can be assigned to four bits of data that can represent 16 distinct colors or 16 distinct symbols for display by a single pixel or group of pixels, a 32-multiple text character 112 can be assigned to five bits of data that can represent 32 distinct colors or 32 distinct symbols for display by a single pixel or group of pixels, and a 64-multiple text character 112 can be assigned to six bits of data that can represent 64 distinct colors or 64 distinct symbols for display by a single pixel or group of pixels.

Figure 3E:
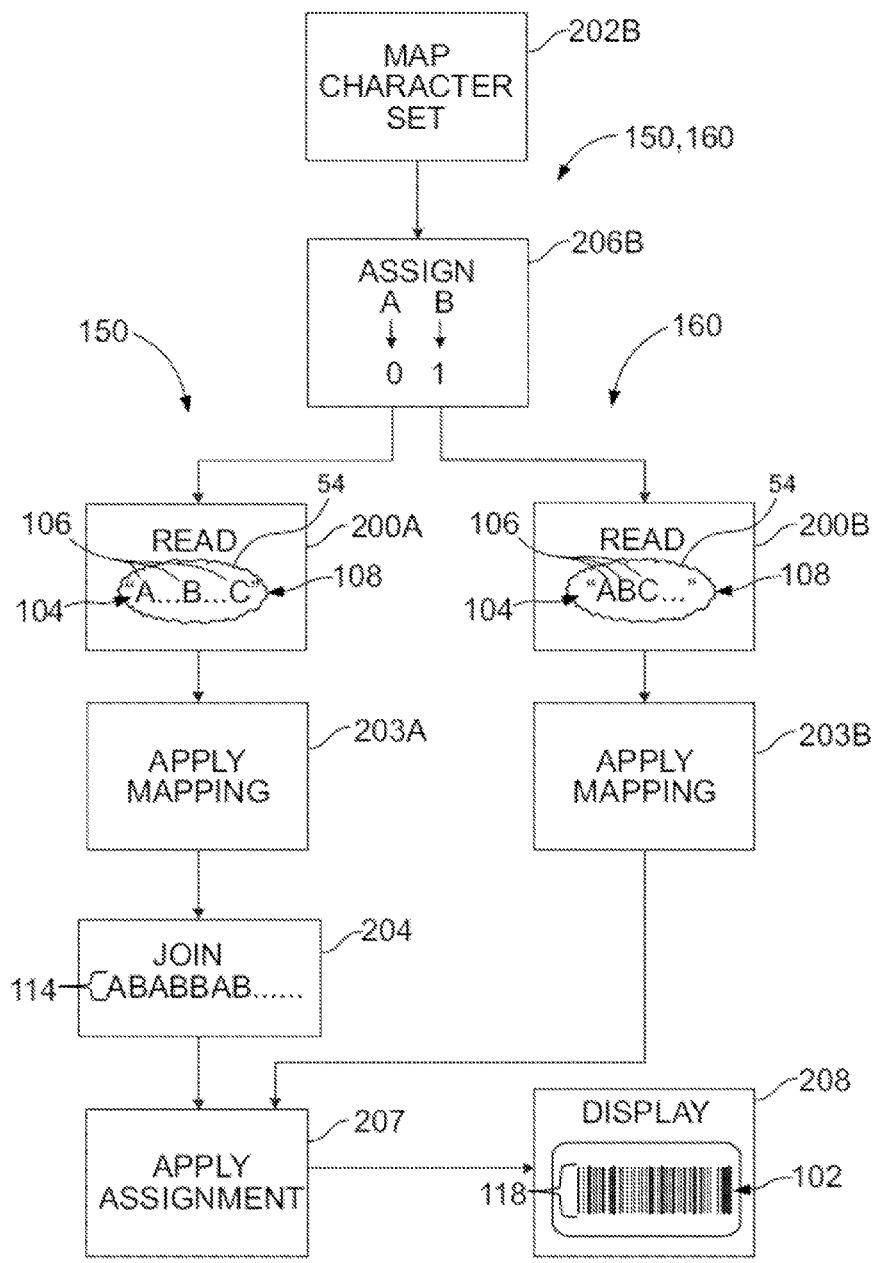
FIG. 3E illustrates two further embodiments of a method for generating an image from a string of text.

In another embodiment 150, Block 206B executes to assign a value of each of the multiple-valued text characters 112 to one bit 116 of a plurality of bits 118 before execution of the Block 200A, as illustrated by the left side of the flowchart in FIG. 3E. A further embodiment 160 includes the Block 206B executing before the Block 200B, as illustrated by the right side of the flowchart in FIG. 3E. Following the left side of the flowchart, the Blocks 203A and 204 in the embodiment 150 execute as described hereinabove with regard to FIG. 3B. Following the right side of the flowchart the Block 203B in the embodiment 160 executes as described hereinabove with regard to FIG. 3C. In both the embodiments 150 and 160, Block 207 executes to apply the assignment of values executed by the Block 206B for each of the multiple-valued text characters 112. The Blocks 206B and 207 may be a process or a portion of a process running on the database server 56.

In all of the embodiments thus far disclosed, 100, 120, 130, 140, 150, and 160, Block 208 executes a step in rendering the image 102 by displaying the plurality of bits 118 that comprise the image 102. The Block 208 may be a process or a portion of a process running on the database server 56. The plurality of bits 118 is displayed as an image 102, for example, a machine readable bitmap image 102 having predetermined height and width of the bits 118, which may be set in the bitmap header as known in the art. The image 102 can represent, by way of example and not limitation, an image of a person, a place, a thing, a logo, a one-dimensional barcode, a two-dimensional barcode, or any other graphical image as known in the art.

An example of sample code for the execution of the Block 208 is illustrated in FIGS. 6-8 by way of example and not limitation. Referring to FIG. 7, the code generates a bitmap header as known in the art. The variable Result, described hereinabove with regard to FIG. 6, is appended onto a right side of the bitmap header. Referring to FIG. 8, a "VIEW" function is used to display the bitmap image 102 generated through the steps illustrated in FIGS. 6 and 7.

The "VIEW" function provides a "virtual table" created from underlying text within a column of the database server 56. In FIG. 8, input to the "VIEW" function is "Worksheet ID," which represents the strings 104 of text characters 106 in memory locations within the database server 56. Output of the "VIEW" function is "Bar Code," which represents the bitmap image 102 constructed by the code in FIGS. 6 and 7, where the first bit of each byte is used and the other seven bits are discarded.

The bitmap image 102 may be stretched horizontally or vertically for display and subsequent printing. Such stretching is common for a rendering of a bitmap. For example, a rendering device may be preset to stretch the bitmap image 102 to make it 5 times wider and 20 times taller. Such asymmetrical expansion may be applied to a horizontal single-line bitmap image comprising a horizontally arranged series of dark and light spaces. For example, in such an asymmetrical expansion, the horizontally arranged series of dark and light spaces may be stretched vertically into a horizontally arranged series of dark and light vertical bars, and stretched horizontally for improved clarity of horizontal separation between the dark and light vertical bars. In one embodiment, such a stretched image can be used to represent a bar code, for example, as illustrated in FIGS. 3A-3E, 9, 12, and 13.

Variations may be applied to the order of the steps executed by the Blocks 200A-208, for example, the Block 206A may be executed before the Block 204 in the embodiments 100 and 120, discussed hereinabove with regard to FIGS. 3A and 3B, respectively. Similarly, the Block 207 may be executed before the Block 204 in the embodiment 150, described hereinabove with regard to FIG. 3E. In addition, referring to the embodiments 150, 160 in FIG. 3E, the Blocks 202B, 203A, and 203B may be eliminated and the Blocks 202A and 202C may be added, executing after the Blocks 200A and 200B, respectively.

Figures 9, 10:
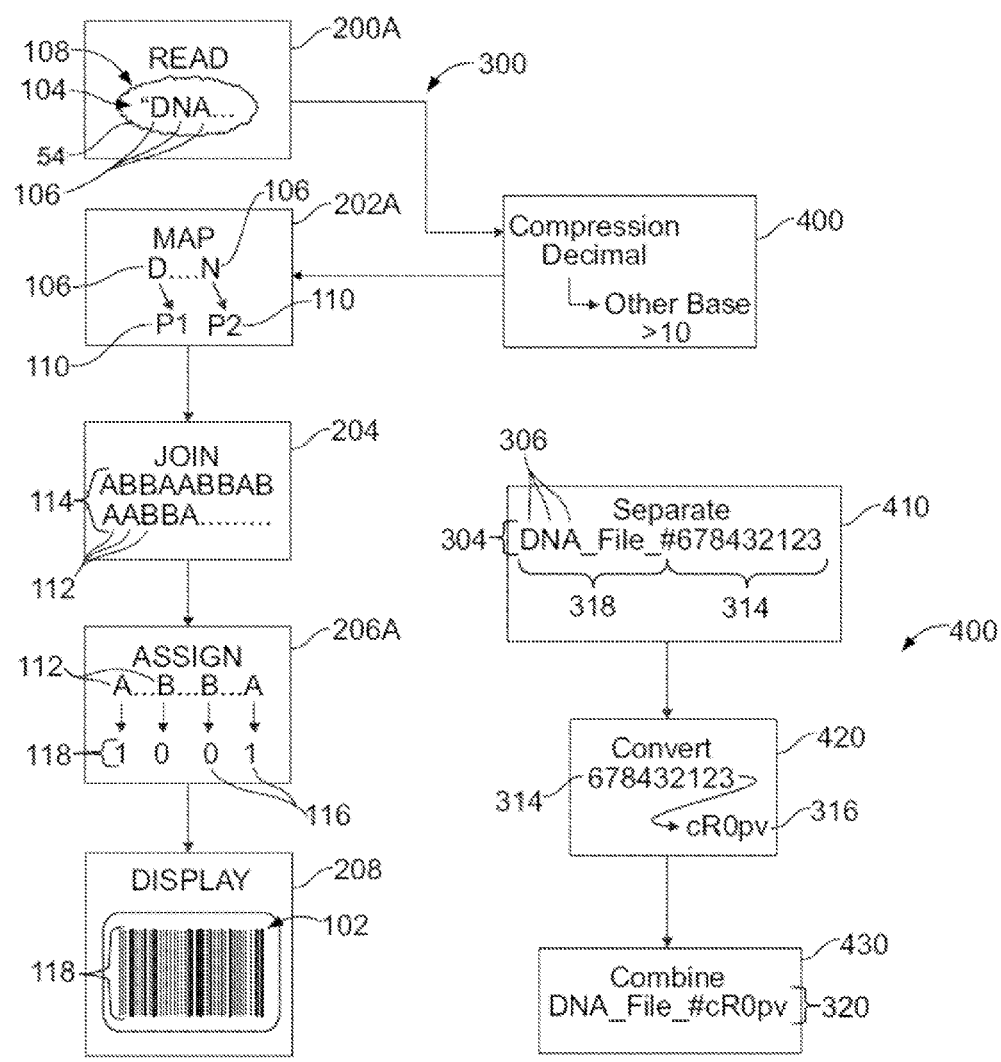
FIG. 9 illustrates another embodiment of a method for generating an image from a string of text.
FIG. 10 illustrates a method for converting a decimal number to a base 64 number.

Variations may also be applied to the steps executed by the Blocks 200-208 described hereinabove, resulting in many variations in the type and appearance of the image 102. Further, other embodiments of the method 100 described hereinabove may include further steps. For example, another embodiment of a method 300 for generating an image 302 from a string 304 of text characters 306 includes all of the steps described hereinabove for any of the methods 100, 120, 130, 140, 150, and 160 described with regard to FIGS. 3A-3E. Referring to FIG. 9, the method 300 further includes a compression step, represented by the addition of a Block 400 prior to the Block 202A of the method 100. In other embodiments, the Block 400 may be added before the Block 203A in FIG. 3B, before the Block 203B in FIG. 3C, before the Block 202C in FIG. 3D, and before either of the Blocks 203A and 203B in FIG. 3E.

Block 400 executes a compression step that affords the compression of large decimal numbers having many digits to, for example, a base 64 (or any other base greater than 10) number having fewer digits. Base 64 is convenient because a typical alphanumeric character set includes 26 capital letters, 26 lower case letters and ten decimal digits for a total of 62 characters. Addition of, for example, a dash and a space creates a convenient character set having 64 distinct characters. Such a character set can form the basis for conversion of a decimal number to a base 64 number wherein each digit is one of the 64 distinct characters.

As an example of the compression of a large decimal number 314 to a base 64 number 316 for use in any of the above described methods, consider the string 304 of text characters 306 including the decimal number 314 having a value of 678,432,123, as illustrated in FIG. 10. Without compression of the decimal number 314, the string 304 includes 19 characters (including spaces and the # symbol). During execution of the method 100, for example, the Block 202A would therefore map 19 text characters 106 to 19 patterns 110 (P1, P2, . . . ) of binary-valued text characters 112. Execution of the Block 400 produces a second string 320 that has a fixed length for a wide range of decimal numbers, which can lower the number of digits mapped by the Block 202A, and may also be useful for other reasons as known in the art.

Referring to FIG. 10, the Block 400 has been expanded into Blocks 410, 420, and 430. Block 410 separates the string 304 into a string of letters 318 and the decimal number 314. In this example, the string of letters 318 is "DNA_FILE_#" and the decimal number 314 is "678432123." Block 420 converts the decimal number 314 into a base 64 number 316 using any convenient method for converting decimal numbers to base 64 numbers as known in the art.

In this example, the decimal value 678432123 converts to a base 64 number having the base 64 value cR0pv, which has 5 digits, thus saving execution of the Block 202A on four text characters 106. Block 430 combines the string of letters 318 with the base 64 number 316, having a value of cR0pv to produce the second string 320 of text characters 306 represented as "DNA_FILE_#cR0pv."

An example of sample code for the execution of the Block 420 is illustrated in FIG. 11 by way of example and not limitation. Referring to FIG. 11, the character set Base64Set, having 64 distinct characters used for conversion to a base 64 number is presented in the second line of the code. Beginning at the line "begin," the code executes a "BitAnd" function on the decimal number 314 having the value 678432123 and a second decimal number having a value of 63, corresponding to a base 64 conversion. The result of the "BitAnd" function is then assigned one of the characters of the Base64Set based on decimal value of the result. A Base64Set character is thus assigned for each base 64 digit, where each subsequent digit is appended onto a left side of each previous digit to produce the base 64 number 316.

Figure 12:
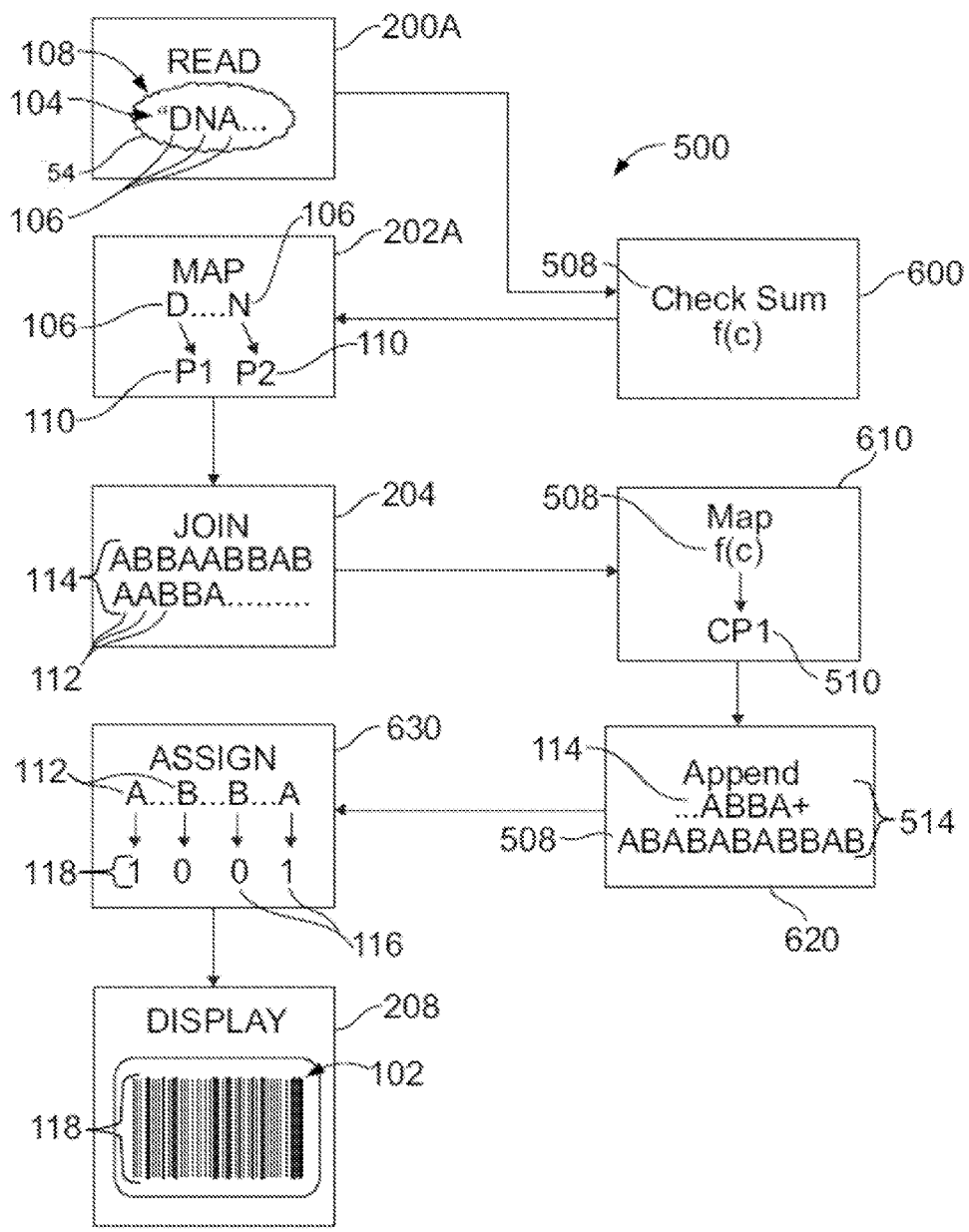
FIG. 12 illustrates a further embodiment of a method for generating an image from a string of text.

In another embodiment, a method 500 for generating the image 102 from the string 104 of text 106 includes all of the steps described hereinabove for any of the methods 100, 120, 130, 140, 150, and 160 described with regard to FIGS. 3A-3E. The method 500 further includes the computation of a checksum 508, as illustrated in FIG. 12. In any of the above methods, the checksum 508 is computed by Block 600 after execution of the either of the Blocks 200A or 200B and before execution of the Blocks 206A or 207 (Block 630 in FIG. 12), for example, immediately following execution of the Block 200A, as illustrated in FIG. 12.

There are many methods of computing a checksum as known in the art. Accordingly, the formula for the checksum 508 has been generically labeled f(c) in FIG. 12. One sample formula for computing the checksum 508, presented by way of example and not limitation, is a summation over index i of i times the value of the $i^{th}$ text character. In the case of the character string "DNA_FILE_#cR0pv," and the character set having 64 distinct characters described above with regard to FIG. 10, this formula expands as 1*14+2*24+3*11 . . . , etc. Regardless of the particular formula used, ultimately the computed checksum 508 may be converted to a base 64 number (or other base as desired) and/or run through a modulus as desired to produce a number having a single digit.

Referring to FIG. 12, block 610 executes following execution of the Block 600 and before execution of the Block 630, for example, immediately following execution of the Block 204, as illustrated. The Block 610 maps the checksum 508 to a second pattern 510 ($CP_1$) of multiple-valued text characters 112 following the same methodology described hereinabove with regard to the execution of the Block 202A for the method 100.

Following execution of the Block 610, Block 620 executes prior to the Block 630 to append the second pattern 510 to the composite pattern 114 to produce an expanded composite pattern 514 including the checksum 508. Following execution of the Block 620, Block 630 assigns a value of each of the multiple-valued text characters 112 of the expanded composite pattern 514 to at least one bit 116 of a plurality of bits 118 following the same methodology described hereinabove with regard to the execution of the Block 206A for the method 100.

The checksum 508 for a machine readable image 102, for example, a barcode is typically printed onto an item along with the image 102. Upon scanning of the item, a second checksum 510 is computed, for example, via software and/or hardware within the scanner for the scanned image and compared to the printed checksum 508 to verify that the image 102 has been correctly printed and correctly scanned. An example of sample code for the execution of the Blocks 600, 610, and 620 is illustrated in FIG. 5 by way of example and not limitation. Referring to FIG. 5, the checksum 508 is computed by use of the above noted sample formula.

Figure 13:
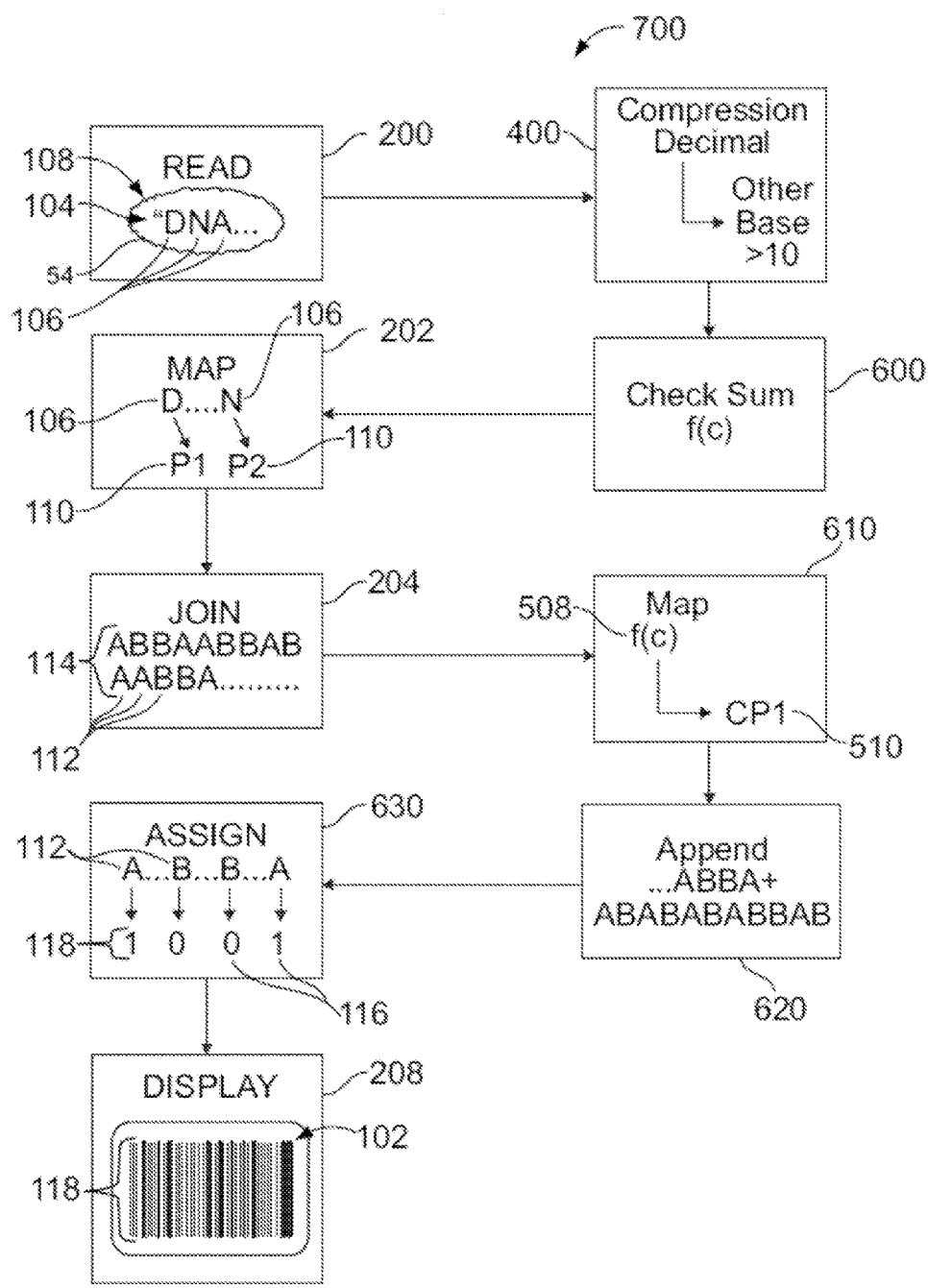
FIG. 13 illustrates yet another embodiment of a method for generating an image from a string of text.

Another method 700 for generating the machine readable image 102 from the string 104 of text 106 includes all of the steps described hereinabove for the methods 100, 120, 130, 140, 150, 160, and 500 with regard to FIGS. 3A-3E, and 12. The method 700 further includes execution of the Block 400, described hereinabove for the method 300 with regard to FIG. 9, for compressing the string 104 of text characters 106 to produce the second string 320 of text characters 106, as illustrated in FIG. 13.

An improved method for generating an image from a string of text characters is presented. The method does not utilize special fonts or image libraries and may be entirely executed within a database server. The method executes all steps of the method within the database server, and may be executed on any database server.

It will be appreciated by those skilled in the art that changes could be made to the embodiments described hereinabove without departing from the broad concepts disclosed therein. It is understood, therefore, that this disclosure is not limited to the particular embodiments disclosed, but it is intended to cover modifications that may include a combination of features illustrated in one or more embodiments with features illustrated in any other embodiments. Various modifications, equivalent processes, as well as numerous structures to which the present disclosure may be applicable will be readily apparent to those of skill in the art to which the present disclosure is directed upon review of the present specification. Accordingly, this description is to be construed as illustrative only and is presented for the purpose of enabling those skilled in the art to make and use the method for generating an image described herein and to teach the best mode of carrying out the same.

We claim:

1. A computer assisted method for generating an image from a text character, the method comprising the steps of:
   reading the text character from a machine readable storage device;
   pattern mapping the text character to a pattern of multiple-valued text characters; and
   rendering the image.

2. The method of claim 1, further comprising the following three steps:
   computing a checksum for the text character;
   mapping the checksum to a second pattern of multiple-valued text characters; and
   appending the second pattern to the first named pattern;
   wherein the reading step occurs prior to any of the three steps.

3. The method of claim 2, further including the step of printing the image, wherein the printing step is subsequent to all other steps.

4. The method of claim 3, wherein the image comprises a barcode.

5. The method of claim 1, wherein the rendering step further includes the steps of:
   assigning a value of each multiple-valued text character to at least one bit; and
   displaying the image comprising the at least one bits.

6. A computer assisted method for generating an image from a string of text characters, the method comprising the steps of:
   reading the string from a machine readable storage device;
   pattern mapping each text character to a pattern of multiple-valued text characters;
   appending the patterns to produce a composite pattern; and
   rendering the image.

7. The method of claim 6, wherein the steps are executed in the order listed.

8. The method of claim 6, further including the step of compressing the string of text characters to produce a second string of text characters, wherein the compressing step occurs after the step of reading the first named string.

9. The method of claim 8, wherein the step of compressing the first named string of text characters further comprises the steps of:
   separating the first named string of text characters into a string of letters and a base 10 number;
   converting the base 10 number into a number having a base greater than 10; and
   combining the string of letters and the number having a base greater than 10 to produce the second string of text characters.

10. The method of claim 6, further comprising the following three steps:
    computing a checksum for the string of text characters;
    mapping the checksum to a second pattern of multiple-valued text characters; and
    appending the second pattern to the composite pattern;
    wherein the reading step occurs prior to any of the three steps.

11. The method of claim 10, wherein the image comprises a barcode.

12. The method of claim 6, wherein each multiple-valued text character has a multiple value of 2 and the step of assigning a value of each multiple-valued text character to at least one bit further comprises the steps of:
    encoding each multiple-valued text character as a binary number having at least one digit thereof set to zero or at least one digit thereof set to one; and
    assigning a value to a bit for each binary number, wherein the value is determined by the value of the at least one digit.

13. The method of claim 6, further including the step of printing the image, wherein the printing step is subsequent to all other steps.

14. The method of claim 6, wherein the rendering step further includes the steps of:
    assigning a value of each multiple-valued text character to at least one bit; and
    displaying the image comprising the at least one bits.

15. A computer assisted method for generating an image from a string of text characters of a set of text characters, the method comprising the steps of:
    pattern mapping each of the set of text characters to a pattern of multiple-valued text characters;
    reading the string of text characters from a machine readable storage device;
    applying the pattern mapping to the string to produce a composite pattern of multiple-valued text characters; and
    rendering the image.

16. The method of claim 15, wherein the steps are executed in the order listed.

17. The method of claim 15, further comprising the following three steps:
    computing a checksum for the string of text characters;
    mapping the checksum to a second pattern of multiple-valued text characters; and
    appending the second pattern to the composite pattern;
    wherein the reading step occurs prior to any of the three steps.

18. The method of claim 15, further including the step of compressing the string of text characters to produce a second string of text characters, wherein the compressing step occurs after the step of reading the first named string.

19. The method of claim 15, wherein the image comprises a barcode.

20. The method of claim 15, further including the step of printing the image, wherein the printing step is subsequent to all other steps.

21. The method of claim 15, wherein the rendering step further includes the steps of:
    assigning a value of each multiple-valued text character to at least one bit; and
    displaying the image comprising the at least one bits.

22. A computer assisted method for generating an image from a string of text characters of a set of text characters, the method comprising the steps of:
    assigning values of multiple-valued text characters to bits;
    reading the string of text characters from a machine readable storage device;
    pattern mapping each text character to a pattern of multiple-valued text characters; and
    rendering the image.

23. The method of claim 22, wherein the steps are executed in the order listed.

24. The method of claim 22, further comprising the following three steps:
    computing a checksum for the string of text characters;
    mapping the checksum to a second pattern of multiple-valued text characters; and
    appending the second pattern to the first named pattern;
    wherein the reading step occurs prior to any of the three steps.

25. The method of claim 22, further including the step of compressing the string of text characters to produce a second string of text characters, wherein the compressing step occurs after the step of reading the first named string.

26. The method of claim 22, wherein the image comprises a barcode.

27. The method of claim 22, further including the step of printing the image, wherein the printing step is subsequent to all other steps.

28. The method of claim 22, wherein the rendering step further includes the steps of:
    implementing the assignment of values of the multiple-valued text characters to the pattern; and
    displaying the image comprising the bits.

29. A computer assisted method for generating a machine readable image from a string of text characters of a set of text characters, the method comprising the steps of:
- pattern mapping each of the set of text characters to a pattern of multiple-valued text characters;
- assigning a value of each multiple-valued text character to at least one bit;
- reading the string of text characters from a machine readable storage device;
- applying the pattern mapping to the string to produce a composite pattern of multiple-valued text characters; and
- rendering the image.

30. The method of claim 29, wherein the steps are executed in the order listed.

31. The method of claim 29, further comprising the following three steps:
- computing a checksum for the string of text characters;
- mapping the checksum to a second pattern of multiple-valued text characters; and
- appending the second pattern to the composite pattern;
- wherein the reading step occurs prior to any of the three steps.

32. The method of claim 29, further including the step of compressing the string of text characters to produce a second string of text characters, wherein the compressing step occurs after the step of reading the first named string.

33. The method of claim 29, wherein the image comprises a barcode.

34. The method of claim 29, further including the step of printing the image, wherein the printing step is subsequent to all other steps.

35. The method of claim 29, wherein the rendering step further includes the steps of:
- implementing the assignment of values of the multiple-valued text characters to the composite pattern; and
- displaying the image comprising the at least one bits.

36. A computer assisted method for generating an image from a string of text characters on a database server, the method comprising the steps of:
- executing a first process within the database server for reading the string of text characters from a storage location within the database server;
- executing a second process on the database server for pattern mapping the string of text characters to a pattern of multiple-valued text characters; and
- executing a third process on the database server for rendering the image.

37. The method of claim 36, wherein the step of executing the second process further includes the steps of:
- executing a fourth process on the database server for pattern mapping each text character of the string of text characters to a pattern of multiple-valued text characters;
- executing a fifth process on the database server for joining the patterns to produce a composite pattern of multiple-valued text characters;

38. The method of claim 36, further comprising the following three steps:
- executing a fourth process on the database server for computing a checksum;
- executing a fifth process on the database server for mapping the checksum to a second pattern of multiple-valued text characters; and
- executing a sixth process on the database server for appending the second pattern to the composite pattern, wherein the step of executing the first process occurs prior to any of the three steps.

39. The method of claim 36, further including the step of executing a fourth process on the database server for compressing the string of text characters to produce a second string of text characters, wherein the compressing step occurs after the step of executing the first process.

40. The method of claim 36, further including the step of executing a fourth process on the database server for transmitting the image to a printer for printing the image onto an object, wherein the step of executing the fourth process is subsequent to all other steps.

41. The method of claim 36, wherein the image comprises a one dimensional barcode.

42. The method of claim 36, wherein the image comprises a two dimensional barcode.

43. The method of claim 36, wherein the step of executing the third process further includes the steps of:
- executing a fourth process on the database server for assigning a value of each multiple-valued text character to at least one bit; and
- executing a fifth process on the database server for displaying the image comprising the at least one bits.

* * * * *